United States Patent [19]

Bruni

[11] Patent Number: 4,515,003
[45] Date of Patent: May 7, 1985

[54] PISTON SHAPING

[75] Inventor: Ludovico Bruni, Turin, Italy

[73] Assignee: Associated Engineering Italy S.p.A., Turin, Italy

[21] Appl. No.: 512,404

[22] Filed: Jul. 8, 1983

Related U.S. Application Data

[63] Continuation-in-part of Ser. No. 263,688, May 14, 1981, abandoned.

[30] Foreign Application Priority Data

May 20, 1980 [IT] Italy ................... 9440 A/80

[51] Int. Cl.³ ............................................. B23P 15/10
[52] U.S. Cl. .............................. 72/370; 29/156.5 R
[58] Field of Search ............... 72/370, 112; 29/156 R; 123/193 P

[56] References Cited

U.S. PATENT DOCUMENTS

| Re. 26,764 | 1/1970 | Packard et al. ................ 92/187 |
| 1,360,558 | 11/1920 | Mattsson ..................... 29/149.5 R |
| 1,722,389 | 7/1929 | Opie ........................... 29/156.5 A |
| 2,043,103 | 6/1936 | Shoemaker .................... 92/187 |
| 2,652,620 | 9/1953 | Sutowski ...................... 72/378 |
| 2,703,264 | 3/1955 | Pitner ......................... 92/187 |
| 2,851,319 | 9/1958 | Pitner ........................ 29/156.5 R |
| 3,129,966 | 4/1964 | Blank ......................... 403/150 |
| 3,161,185 | 12/1964 | Justinien et al. ............. 92/187 |
| 4,189,932 | 2/1980 | Fielder ....................... 29/156.5 R |

FOREIGN PATENT DOCUMENTS

| 750462 | 5/1944 | Fed. Rep. of Germany . |
| 1650206 | 8/1970 | Fed. Rep. of Germany . |
| 292937 | 11/1928 | United Kingdom . |
| 501713 | 3/1939 | United Kingdom . |
| 1362262 | 8/1974 | United Kingdom . |
| 1464204 | 2/1977 | United Kingdom . |

Primary Examiner—Lowell A. Larson
Assistant Examiner—Jorji M. Griffin
Attorney, Agent, or Firm—Leydig, Voit, Osann, Mayer & Holt, Ltd.

[57] ABSTRACT

A method of shaping the gudgeon pin bores formed in gudgeon pin bosses of pistons comprises introducing into the bores portions of a pin-shaped tool before the insertion of the gudgeon pin. A load is applied to the pin-shaped tool and the direction of the load and the shape of the pin-shaped tool are chosen so that areas of bore-defining walls of the bosses subjected to high stresses by the gudgeon pin in use, and therefore liable to crack, are radially outwardly deformed to reduce the incidence of cracks.

20 Claims, 11 Drawing Figures

PISTON SHAPING

This application is a continuation-in-part of U.S. patent application No. 263,688 filed May 14, 1981 now abandoned.

BACKGROUND TO THE INVENTION

1. Field of the Invention

The invention relates to the shaping of the gudgeon pin bores formed in gudgeon pin bosses of pistons for internal combustion engines or compressors.

When the piston is in use in an engine, the gudgeon pin bosses are subject to high stresses applied by the associated connecting rod through a cylindrical gudgeon pin which is fitted tightly in the bores. The gudgeon pin bosses hold the ends of the gudgeon pin while the connecting rod engages a central portion of the gudgeon pin. The maximum forces are generated during the firing stroke of the piston as a result of detonation of a charge in the associated piston. These forces urge the piston downwardly and this tends to bow or bend the ends of the gudgeon pin downwardly and force the centre of the gudgeon pin upwardly. This, in turn, causes the gudgeon pin and the gudgeon pin bosses to be forced into engagement with one another, particularly at the inner ends of the bores in those areas of the bore-defining walls of the gudgeon pin bosses which lie on the crown side of a plane which includes the common axis of the gudgeon pin bores and which is normal to the piston axis. The high stresses induced in these areas can lead to the appearance of cracks in the gudgeon pin bosses which start in these areas and rapidly spread. Such cracks cause the piston to fail and are therefore highly undesirable.

2. Review of the Prior Art

The existence of these high stresses and the appearance of cracks have been known for many years and there have been many previous measures directed to reducing their incidence. These measures are performed before the gudgeon pin is assembled onto the connecting rod with the gudgeon pin and comprise the formation of reliefs in those highly stresses areas where cracks are most likely to appear. The presence of a relief reduces the forces created between the gudgeon pin and the gudgeon pin bosses as the gudgeon pin bends or bows and so reduces the stresses and the incidence of cracks.

These reliefs have heretofore been formed by a machining process involving the cutting-away of the appropriate areas of the gudgeon pin bosses using, for example, a milling cutter. Another proposal has been to form the reliefs by roll-burnishing around the whole interior surface of the gudgeon pin bosses. Examples of these techniques are shown in U.S. Pat. Re. Nos. 26,764 and 4,189,932 and British Patent Specification Nos. 1,464,204 and 1,362,262.

These known techniques have the disadvantages that they require a separate machining step. In addition, the extent of the relief can only be guessed so that it is possible for the relief to be either excessive or insufficient, both of which are undesirable.

SUMMARY OF THE INVENTION

According to the invention there is provided a method of shaping gudgeon pin bores formed in respective gudgeon pin bosses of a piston for an internal combustion engine or a compressor, the method comprising, before the insertion of the piston into the engine or compressor, the steps of introducing respective portions of a pin-shaped tool into the gudgeon pin bores and then applying a load to the pin-shaped tool, the direction of application of the load and the shape of said portions of the pin-shaped tool being such as to deform radially outwardly respective areas of bore-defining walls of the gudgeon pin bosses which extend to the inner ends of the bores and which lie on the crown side of a plane which includes the common axis of the gudgeon pin bores and which is normal to the piston axis, whereby, when the piston is inserted into an internal combustion engine or compressor, said deformed areas form a relief between the gudgeon pin bosses and the gudgeon pin.

According to a second aspect of the invention, there is provided a method of shaping gudgeon pin bores formed in respective gudgeon pin bosses of a piston for an internal combustion engine or a compressor, the method comprising, before the insertion of the piston into an internal combustion engine or compressor, the steps of introducing portions of a shaped elongate rod member into the gudgeon pin bores, applying a load to the shaped member intermediate the gudgeon pin bores and in a direction towards a crown of the piston whereby said portions of the shaped member deform radially outwardly respective areas of bore-defining walls of the gudgeon pin bosses, the areas extending to the inner ends of the bores and lying on the crown side of a plane which includes the common axis of the gudgeon pin bores and which is normal to the piston axis.

The invention also includes within its scope a piston when made by either of the methods described above.

BRIEF DESCRIPTION OF THE DRAWINGS

The following is a more detailed description of some embodiments of the invention, by way of example, reference being made to the accompanying drawings, in which.

Figure 1:
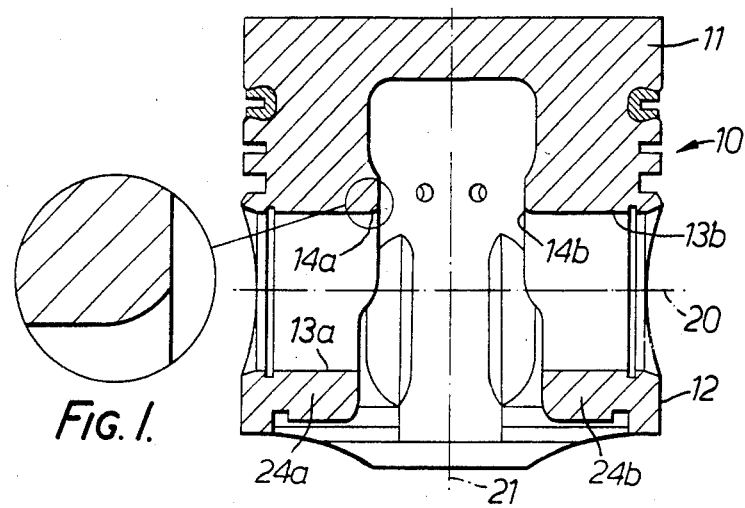
FIG. 1 is a cross-sectional view of a piston for an internal combustion engine or a compressor; part of an inner end of a gudgeon pin bore formed in a gudgeon pin boss of the piston being shown on an enlarged scale in an insert.

Referring first to FIG. 1, the piston 10 comprises a crown 11 and a skirt 12. Two co-axial gudgeon pin bores 13a, 13b are formed in respective gudgeon pin bosses 24a, 24b, extend inwardly from the skirt 12 and terminate at respective inner ends 14a, 14b within the piston 10. In use, the piston 10 slides within a cylinder of an internal combustion engine or a compressor and is connected to a connecting rod (not shown) by a cylindrical gudgeon pin (not shown) in the normal way.

During operation of the internal combustion engine, a downward force is applied to the piston by detonation of the charge within the cylinder to cause the piston for perform the firing stroke, while an upward force is applied by the connecting rod during the compression stroke. These forces are transmitted between the piston 10 and the connecting rod by the gudgeon pin and the gudgeon pin bosses 24a, 24b and these forces cause the gudgeon pin to bend or bow. This bending or bowing is at a maximum during the expansion stroke of the piston 10 when the ends of the gudgeon pin bend downwardly and the centre of the gudgeon pin bends upwardly. This causes high stresses at the inner ends 14a, 14b of the gudgeon pin bosses 24a, 24b in the bore-defining walls of the gudgeon pin bosses 24a, 24b which lie on the crown side of a plane which includes the common axis 20 of the gudgeon pin bores 13a, 13b and which is normal to the piston axis 21. These stresses can lead to cracking of the gudgeon pin bosses and ultimately to piston failure.

Figure 2A:
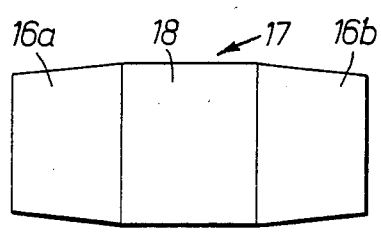
FIGS. 2A, 2B and 2C are respective side elevations of a pin-shaped tool for use in shaping the gudgeon pin bores of the piston of FIG. 1; each Figure showing an alternative shape of boss-engaging portions of the pin-shaped tool.
Figure 2B:
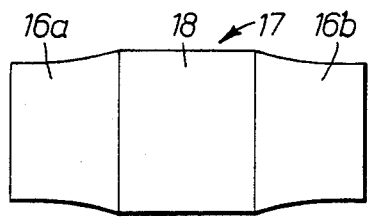
Figure 2C:
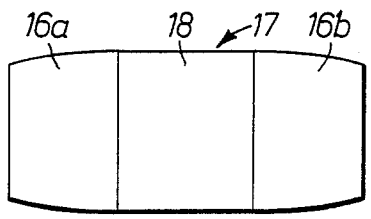
Figure 5:
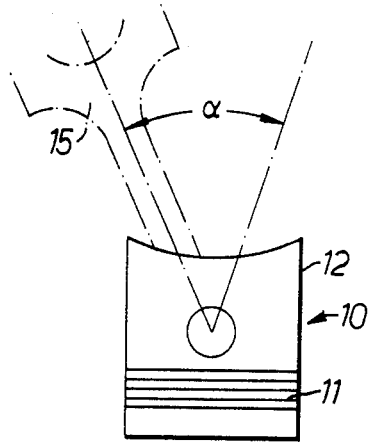
FIG. 5 is a diagram showing directions of application of a load to the pin-shaped tools of FIGS. 2A, 2B or 2C mounted in the gudgeon pin bores of the piston of FIG. 1.

The method now to be described with reference to the drawings seeks to reduce the incidence of such cracks and comprises introducing respective portions 16a, 16b of a pin-shaped tool 17 (see FIGS. 2A, 2B or 2C) into the gudgeon pin bores 13a, 13b. A load is then applied by a rod 15 (FIG. 5) to a part 18 of the pin-shaped tool 17 intermediate the bores to deform radially outwardly areas of the bore-defining walls of the gudgeon pin bosses 24a, 24b which extend to the inner ends 14a, 14b of the bores and which lie on the crown side of a plane which includes the common axis 20 of the bores and which is normal to the piston axis 21.

The direction at which the load is applied to the pin-shaped tool 17 is preferably chosen to coincide with the direction of the connecting rod when applying the most critical load to the gudgeon pin in the gudgeon pin bores 13a, 13b when the piston 10 is assembled and operating in a compression stroke of an internal combustion engine. This direction of application of the load will depend on the type and location of cracks which are observed in failed, unmodified, pistons. In general, the line of the load will lie within the arc shown as having angle α in FIG. 5.

The pin-shaped tool 17 does not have the shape of a gudgeon pin because it is especially shaped as an elongate rod member to produce a required deformation of the gudgeon pin bores 13a, 13b. Thus, the pin-shaped tool 17 has increased size at those regions where deformation is required. For example, the boss-engaging portions 16a, 16b of the pin-shaped tool 17 may have a circular external cross-section which decreases in diameter from the inner ends of the portions to the respective ends of the pin-shaped tool 17. This ensures that the amount by which the surfaces of the bores 13a, 13b are deformed is a maximum at the inner ends of the bores 13a, 13b and decreases in an axial direction along the bores from said inner ends. The boss-engaging portions 16a, 16b may be frusto-conical (FIG. 2A) or may be concave (FIG. 2B) or convex (FIG. 2C) to produce frusto-conical, convex and concave shaped deformations respectively.

Figure 3A:
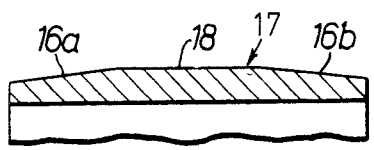
FIGS. 3A, 3B and 3C are longitudinal cross-sections of parts of the pin-shaped tool of FIG. 2A showing respective alternative internal shapes of a bore of the pin-shaped tool of FIG. 2A.
Figure 3B:
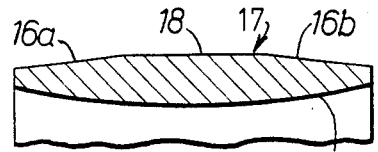
Figure 3C:
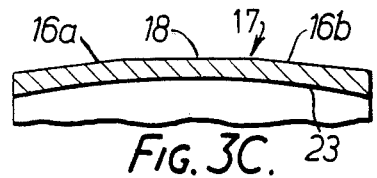

The extent of the deformation in an axial direction from the inner ends 14a, 14b of the bores can be controlled by controlling the axial flexibility of the pin-shaped tool 17. For this purpose, the pin-shaped tool 17 has an axial bore 19 whose axial shape determines the axial flexibility of the pin-shaped tool 17. The shape of the bore may, as shown in FIG. 3A, be a constant cross-sectional area along the length of the bore. Alternatively, the cross-sectional area of the bore 19 may vary from a minimum at the centre of the pin-shaped tool 17 to a maximum at the ends (line 22, FIG. 3B), or may vary from a maximum at the centre of the pin-shaped tool 17 to a minimum at the ends of the pin-shaped tool (line 23, FIG. 3C). The former shape will, in comparison with a constant cross-sectional area bore, distribute the load more towards the end of the pin-shaped tool 17 and thus increase the axial length of the deformation. The latter shape will distribute the load more towards the centre of the pin-shaped tool 17 and thus reduce the axial length of the deformation in comparison with a bore 19 of constant cross-sectional area.

Figure 4A:
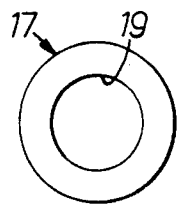
FIGS. 4A, 4B and 4C are cross-sectional views of the pin-shaped tool of FIGS. 2A, 2B or 2C showing three different possible cross-sectional shapes of a bore of the pin-shaped tool.
Figure 4B:
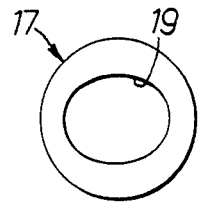
Figure 4C:
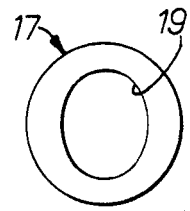

The extent of the deformation in an arcuate direction can be controlled by controlling the flexibility of the pin-shaped tool in a plane normal to the pin axis 20. This control may be achieved by altering the cross-sectional shape of the bore 19. As shown in FIG. 4A, the cross-sectional shape may be circular. Alternatively, as shown in FIGS. 4B and 4C this shape may be elliptical with either the minor axis (FIG. 4B) or the major axis (FIG. 4C) lying along the line of action of the load. The former alignment increases the arcuate extent of the deformation in comparison with a circular cross-section bore 19 while the latter alignment decreases the arcuate extent of the deformation in comparison with the circular cross-section bore 19.

The method described above with reference to the drawings has the advantage of being able to be carried out cheaply and simply. Deformation is limited to those portions of bore-defining walls of the gudgeon pin bosses 24a, 24b which are most highly stressed and thus there is no unnecessary deformation. The method can be readily adapted to all shapes and sizes of piston having two gudgeon pin bores. In addition, the deformation pin-shaped tool 17 reflects, to an increased extent the action of the gudgeon pin in the assembled engine so ensuring that the deformed areas are correctly sized.

I claim:

1. A method of shaping gudgeon pin bores formed in respective gudgeon pin bosses of a piston for an internal combustion engine or a compressor, the method comprising, before the insertion of the piston into the engine or compressor, the steps of introducing respective portions of a pin-shaped tool into the gudgeon pin bores and then applying a load to a part of the pin-shaped tool intermediate the gudgeon pin bores, to deform radially outwardly respective areas of bore-defining walls of the gudgeon pin bosses which extend to the inner ends of the bores and which lie on the crown side of a plane which includes the common axis of the gudgeon pin bores and which is normal to the piston axis, whereby, when the piston is inserted into an internal combustion engine or compressor, said deformed areas form a relief between the gudgeon pin bosses and the gudgeon pin.

2. A method according to claim 1 wherein the load is applied to the pin-shaped tool in a direction which is along the piston axis.

3. A method according to claim 1 wherein the load is applied to the pin-shaped tool in a direction lying in a plane normal to the axis of the gudgeon pin bores and inclined at an angle to the piston axis.

4. A method according to claim 3 wherein the direction is chosen to coincide with the direction of a connecting rod when applying a critical load to a gudgeon pin in the gudgeon pin bores when the piston is, in use, assembled and operating in a firing stroke in an internal combustion engine or a compressor.

5. A method according to claim 1 and comprising the further step of causing the radial extent of deformation of said walls of the gudgeon pin bosses to decrease in an axial direction along the bore from a maximum deformation at the respective inner ends of said bores.

6. A method according to claim 5 wherein the axially decreasing radial deformation is caused by the use of a pin-shaped tool having boss-engaging portions of circular external cross-section, the diameter of said cross-section decreasing from the inner ends of said boss-engaging portions towards the associated ends of the pin-shaped tool.

7. A method according to claim 6 wherein the decrease in diameter is constant along the length of the boss-engaging portions to produce frusto-conical boss-engaging portions.

8. A method according to claim 6 wherein the decrease in diameter varies along said length to produce concave or convex boss-engaging portions.

9. A method according to claim 1 comprising controlling the extent of the deformation in an axial direction from the inner ends of the gudgeon pin bores.

10. A method according to claim 9 wherein said control is by use of a pin-shaped tool having a predetermined flexibility in an axial direction.

11. A method according to claim 10 wherein said flexibility is determined by the use of a pin-shaped tool having an axially extending bore whose axial shape determines the axial flexibility of the pin-shaped tool.

12. A method according to claim 11 wherein the internal cross-section area of said bore in the pin decreases from a maximum at the centre of the pin-shaped tool to a minimum at the ends of the pin-shaped tool.

13. A method according to claim 11 wherein the internal cross-sectional area of the bore in the pin-shaped tool increases from a minimum at the centre of the pin-shaped tool to a maximum at the ends of the pin-shaped tool.

14. A method according to claim 11 wherein the internal cross-section of the bore in the pin-shaped tool is constant along the length of the pin-shaped tool.

15. A method according to claim 1 comprising the further step of controlling the extent of the deformation in a plane normal to the axis of the bores.

16. A method according to claim 15 wherein said control is by use of a pin-shaped tool of differing flexibilities in planes normal to the pin axis and spaced therealong.

17. A method according to claim 16 wherein said flexibility is determined by the use of a pin-shaped tool having an axially extending bore whose cross-sectional shape determines the flexibility of the pin-shaped tool in said planes normal to the piston axis.

18. A method according to claim 17 wherein the bore in the pin-shaped tool has internal cross-section which is elliptical with either the major axis or the minor axis of said elliptical cross-section lying along the line of action of the load.

19. A method according to claim 17 wherein the internal cross-section of the bore in the pin-shaped tool is circular.

20. A method of shaping gudgeon pin bores formed in respective gudgeon pin bosses of a piston for an internal combustion engine or compressor, the method comprising, before the insertion of the piston into an internal combustion engine or compressor, the steps of:
  introducing portions of a shaped elongate rod member into the gudgeon pin bores,
  applying a load to the shaped member intermediate the gudgeon pin bores and in a direction towards a crown of the piston whereby said portions of the shaped member deform radially outwardly respective areas of bore-defining walls of the gudgeon pin bosses, the areas extending to the inner ends of the bores and lying on the crown side of a plane which includes the common axis of the gudgeon pin bores and which is normal to the piston axis.

* * * * *